United States Patent [19]

Grossmann

[11] 4,101,216
[45] Jul. 18, 1978

[54] METHOD AND APPARATUS FOR PRINT EXPOSURE CONTROL

[75] Inventor: Walter Grossmann, Russikon, Switzerland

[73] Assignee: Gretag Aktiengesellschaft, Regensdorf, Switzerland

[21] Appl. No.: 722,115

[22] Filed: Sep. 10, 1976

Related U.S. Application Data

[63] Continuation-in-part of Ser. No. 637,103, Dec. 2, 1975, abandoned.

[30] Foreign Application Priority Data

Dec. 13, 1974 [CH] Switzerland ............... 16612/74

[51] Int. Cl.² ............... G03B 27/76; G03B 27/78
[52] U.S. Cl. ............... 355/35; 355/38; 355/77; 356/175; 356/203
[58] Field of Search ............... 355/83, 35, 38, 77, 355/88; 356/175, 202, 203, 178

[56] References Cited

U.S. PATENT DOCUMENTS

| | | | |
|---|---|---|---|
| 3,455,632 | 7/1969 | Neale et al. | 355/77 |
| 3,888,580 | 6/1975 | Amano et al. | 355/38 |
| 3,937,573 | 2/1976 | Rising | 355/83 |

Primary Examiner—L. T. Hix
Assistant Examiner—W. J. Brady
Attorney, Agent, or Firm—Burns, Doane, Swecker & Mathis

[57] ABSTRACT

A method of controlling the exposure in the production of photographic color prints by scanning an original line-by-line and point-by-point with three primary colors to determine the density of each primary color at each point. At each scanned point the difference between the density values of a pair of two of the three primary colors and the difference between another different pair of the three primary colors are compared with the corresponding density difference values of a reference original having a constant density distribution comprising the three primary colors. The density difference comparison forms a selection criteria to determine whether each point scanned is to be used to form density values from which the exposure values for the three primary colors are formed to control exposure of the print material. The selection criteria is as follows:

$$D_i - \frac{aD_i + bD_j + cD_k}{a+b+c} \leqq D_{N_i} - \frac{aD_{N_i} + bD_{N_j} + cD_{Nk}}{a+b+c} \pm d_1$$

$$D_j - \frac{aD_i + bD_j + cD_k}{a+b+c} \leqq D_{N_j} - \frac{aD_{N_i} + bD_{N_j} + cD_{Nk}}{a+b+c} \pm d_2 \text{ and}$$

$$D_k - \frac{aD_i + bD_j + cD_k}{a+b+c} \leqq D_{N_k} - \frac{aD_{n_i} + bD_{N_j} + cD_{N_k}}{a+b+c} \pm d_3$$

where $D_i$, $D_j$ and $D_k$ denote the densities of the scanned points for the primary colors $i$, $j$ and $k$; $a$, $b$ and $c$ are constant factors; $d_1$, $d_2$ and $d_3$ are constant density values and $D_{N_i}$, $D_{N_j}$ and $D_{N_k}$ denote the densities for the primary colors $i$, $j$, and $k$ of a reference original; the scanned points which do not satisfy these conditions being disregarded in determining the area densities.

18 Claims, 3 Drawing Figures

METHOD AND APPARATUS FOR PRINT EXPOSURE CONTROL

This application is a continuation-in-part of my application Ser. No. 637,103 filed Dec. 2, 1975, now abandoned.

FIELD OF THE INVENTION

This invention relates to a method and apparatus for controlling the exposure time in the production of photographic colour prints.

BRIEF REVIEW OF PRIOR ART

In a known method of producing photographic colour prints, the density values of three primary colours in the original are measured and the exposure times determined therefrom, after any necessary corrections. Colour and density dominants may occur as a result of imbalance between the lighter and darker parts of the original. If this imbalance occurs in just one or two colours, the result is a colour dominant while if it occurs uniformly in all three colours it is a density dominant. Colour cast and incorrect exposure must be distinguished from these dominants, since they are density displacements in one, two or all three colours, the density spectrum in the colour or colours concerned remaining substantially unchanged. The proportion of rejects in automatic printers is already relatively low and if it is to be further reduced the separate recognition and objective assessment of such phenomena is necessary. However, this is difficult with known methods which integrally measure the area densities of the original.

German patent specification No. 1 042 374 discloses a method in which the original is scanned point-by-point to determine the density values of three primary colours, the resulting discrete density values being graded into density classes and their frequency distribution determined as a function of these density classes. "Integration" of the discrete density values of the scanned points gives area densities from which the required filter combination for correct exposure of the printing material is determined by mathematical equations. The term "integration" means any kind of combination of the discrete density values to produce area density values. Summation and algebraic averaging are given as examples. Reference is also made generally to a weighted "integration". The different assessment of zones near the edge and centre of the original is the only concrete example given of a weighting programme. The problem of density and colour dominants is not raised in the aforementioned Patent Specification.

German Offenlegungsschrift No. 1 957 757 discloses a method of printing in which zones of the original are scanned and the numbers $n_1$ and $n_2$ of the scanned zones whose measured values are above and below the average value of the measured values of all the scanned zones are evaluated to determine density correction values. In determining the numbers $n_1$ and $n_2$ those measured zones whose measured values are situated in a mean density range dependent on various factors are disregarded. It is said that the fact that certain measured zones are disregarded means that even very unfavourably exposed originals are correctly printed. However, this specification does not deal with the problem of colour and density dominants.

SUMMARY OF THE INVENTION

This invention relates to a method of controlling the exposure in the production of photographic colour prints, in which the density of the original is scanned point-by-point in the three primary colours, area densities in the three primary colours are determined from the resulting density values and these area densities are evaluated in order to determine the exposure values in the three primary colours. The problem of taking the colour and density dominants into account as well is solved in this method by selecting from the scanned points those which satisfy at least two of the three conditions:

$$D_i - \frac{aD_i + bD_j + cD_k}{a + b + c} \leqq D_{N_i} - \frac{aD_{N_i} + bD_{N_j} + cD_{N_k}}{a + b + c} \pm d_1$$

$$D_j - \frac{aD_i + bD_j + cD_k}{a + b + c} \leqq D_{N_j} - \frac{aD_{N_i} + bD_{N_j} + cD_{N_k}}{a + b + c} \pm d_2$$

and $$D_k - \frac{aD_i + bD_j + cD_k}{a + b + c} \leqq D_{N_k} - \frac{aD_{N_i} + bD_{N_j} + cD_{N_k}}{a + b + c} \pm d_3$$

where $D_i$, $D_j$ and $D_k$ denote the densities of the scanned points in question for the primary colours $i$, $j$, and $k$; $a$, $b$ and $c$ are constant factors, $d_1$, $d_2$ and $d_3$ are constant density values, and $D_{N_i}$, $D_{N_j}$ and $D_{N_k}$ denote the densities of the primary colours, $i$, $j$ and $k$ of a reference original; the scanned points which do not satisfy these conditions are disregarded in determining the area densities.

The term "reference original" is used to denote an original which is of constant density preferably over the entire image area (a standard negative) the correct printing of which requires exposure values substantially equal to the mean values of all the exposure values used in printing a relatively large number of negatives, preferably 100 and more. A reference original of this kind can be produced very simply by using just three density values corresponding to the three primary colours.

BRIEF DESCRIPTION OF THE DRAWINGS

A preferred embodiment of the invention will be explained in detail hereinafter with reference to the accompanying drawings wherein.

DETAILED DESCRIPTION OF A PREFERRED EMBODIMENT

Figure 1:
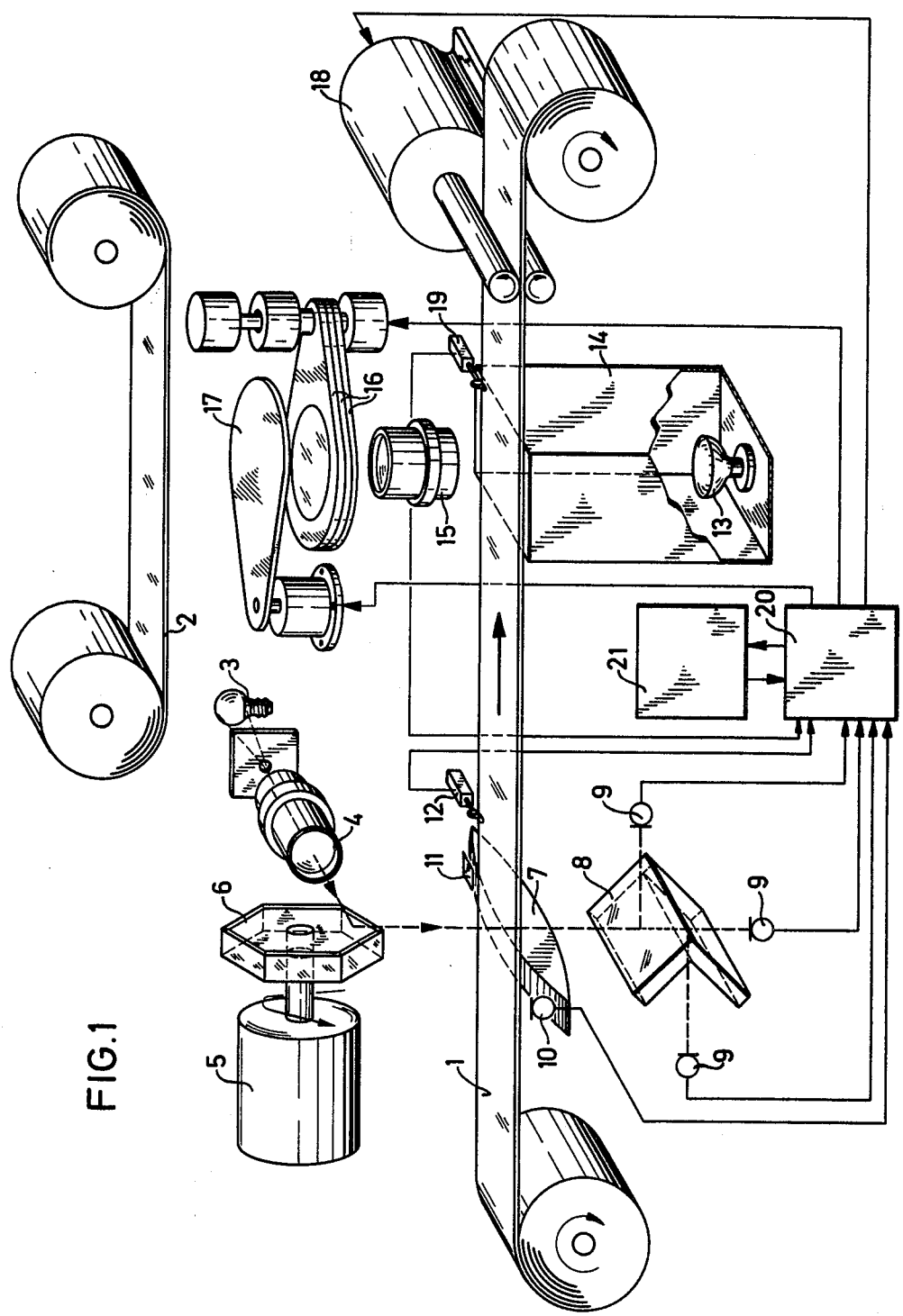
FIG. 1 is an overall perspective view of a printer operable in accordance with the invention.

The printer illustrated in FIG. 1, comprises mainly of two stations through which an original 1 in strip form passes, the original hereinafter being referred to as the "film." The film is scanned in the first station and imaged on a strip of photo-sensitive material 2, generally colour sensitive paper in the second station.

The scanning station comprises a light source, 3, an optical system 4, a mirror drum 6 driven by a synchronous motor 5, a condenser 7, a beam splitter 8 and three photo-cells 9 each responsive to a different one of the primary colours. The scanning beam from the optical system is deflected across the film by the mirror drum. Another photo-cell 10 is disposed at the side of the film 1 and is illuminated once at the beginning of each scanning line, the output from the photo-cell 10 being used for line synchronization. A reference field 11 of a predetermined density is located on the opposite side of the film 1 to the condenser 7 and is also illuminated once per scanning line and serves to calibrate the measuring system. A notch sensor 12 responds to positioning notches at the edge of the film and is used to determine the film position.

The exposure station is that of an ordinary printer and comprises a light source 13, a light well 14 with a diffuser screen, an imaging optical system 15, a servoactuated filter set 16 and a shutter 17. The exposure station also contains a step-by-step motor 18 for film transport and another notch sensor 19.

The sequence of operations at the two stations is controlled by an evaluating and control station 20 to which the stations are connected, the station 20 being in turn connected to a process computer 21, e.g., a Data General Nova 1200 computer.

At the scanning station, the film is scanned by the scanning system in the three primary colours image for image point-wise in lines extending substantially transversely of the longitudinal direction of the film. The transition from one line to the next is obtained by the film advance, which takes place between two exposure phases at the exposure station. The scanning lines are split up into discrete measured points electronically at the evaluating station 20. The mirror drum 6 and the film transport step-by-step motor 18 are synchronized by means of signals from the photo-receiver 10. Since the distances between the individual images on the film 1 are not always constant, the scanning beam may perhaps not be situated exactly between two images when the film is stationary, but may sweep over the zone of an image so that one and the same image line is scanned more than once. At the evaluating station, however, the notch sensor 12 and the control for the film transport step-by-step motor 18 ensure that the measured values from image lines scanned more than once are taken into account only once while measured values from scanning zones situated outside the images are disregarded. This naturally does not apply to the reference field 11, which is scanned at the end of each line and yields a constant reference value by means of which the measuring system is continuously calibrated so that drift is avoided.

The density values of the individual measured points of each image are evaluated by the process computer 21 in accordance with a programme to be described hereinafter, and the control variables for the filter set 16 and the exposure time are determined therefrom. The values obtained are then stored until the relevant image has arrived at the exposure station. The notch sensor 19 causes the film to stop when the image is in the correct position. The exposure values are then automatically adjusted and exposure takes place in manner known per se in accordance with the additive or subtractive principle.

As already stated hereinbefore, the transparency or density of the three primary colours red, green and blue in each image of the original is measured at a given number of measuring points. The output signals of the photo-cells 9, which are proportional to the transparency of the measured points, are first converted to density values by means of a logarithmic analog-digital converter in the process computer 21. At each scanned point the difference between the density values in two primary colours, for example blue and green, is then formed and the difference between the density values of one of these two primary colours and the third primary colour, e.g. green and red, is formed and compared with the corresponding density value differences of a reference original. As already stated hereinbefore, the reference original corresponds to the average of a large number of originals for printing. It has a constant density distribution over the entire image area and is therefore completely defined by each single density value in the three primary colours. These three density values are contained in a store in the process computer 21. The comparison between the original to be printed and the reference original can be expressed by the following formulae:

$$D_B - D_G \leqq D_{N_B} - D_{N_G} \pm d_1$$

$$D_R - D_G \leqq D_{N_R} - D_{N_G} \pm d_3$$

The value of the constants $d_1$ and $d_3$ is approximately 0.1 to 0.2 density units.

This density difference comparison forms a selection criterion as to whether the scanned point in question is or is not to be used to determine the colour corrections for the exposure values. The scanned point is capable of being taken into account only if both of the above conditions are satisfied.

Instead of this relatively simple criterion it is also possible to use a somewhat more complicated one which may be expressed by the following formulae:

$$D_i - \frac{aD_i + bD_j + cD_k}{a+b+c} \leqq D_{N_i} - \frac{aD_{N_i} + bD_{N_j} + cD_{N_k}}{a+b+c} \pm d_1$$

$$D_j - \frac{aD_i + bD_j + cD_k}{a+b+c} \leqq D_{N_j} - \frac{aD_{N_i} + bD_{N_j} + cD_{N_k}}{a+b+c} \pm d_2$$

$$D_k - \frac{aD_i + nD_j + cD_k}{a+b+c} \leqq D_{N_k} - \frac{aD_{N_i} + bD_{N_j} + cD_{N_k}}{a+b+c} \pm d_3$$

In these formulae, the indices $i$, $j$ and $k$ denote the three primary colours, index N the reference original and $a$, $b$ and $c$ constant weighting factors. The constant $d_2$ is of the same order of magnitude as $d_1$ and $d_3$. The weighting factors $a$, $b$ and $c$ are normally in the range from 0 to 1. It is advantageous for their mutual ratio not to exceed 10:1. For most cases, however, it is quite adequate for all the weighting factors to be equal and in consequence the selection criterion for the individual scanned points now reads as follows, for example:

$$D_B - \frac{D_B + D_G + D_R}{3} \leqq D_{N_B} - \frac{D_{N_B} + D_{N_G} + D_{N_R}}{3} \pm d_1$$

$$D_G - \frac{D_B + D_G + D_R}{3} \leqq D_{N_G} - \frac{D_{N_B} + D_{N_G} + D_{N_R}}{3} \pm d_2$$

$$D_R - \frac{D_B + D_G + D_R}{3} \leqq D_{N_R} - \frac{D_{N_B} + D_{N_G} + D_{N_R}}{3} \pm d_3$$

where the letters B, G and R denote the primary colours blue, green and red.

For practical purposes, it is sufficient that at least two of these conditions be satisfied, although it is advantageous for the scanned points used to determine the exposure values to satisfy all three conditions.

A deviation in the density differences of a scanned point from the corresponding differences in the reference original by more than the tolerances determined by the constants $d_1$ to $d_3$ means that the scanned point in question represents a relatively intensely coloured point on the image indicative of a colour dominance and it should therefore not be used for colour correction value determination. In this way, the influence of colour dominates on the colour correction values is minimized.

In the case of originals having a very large proportion of intensely coloured image points, for example water and sky scenes, there is a risk that there will be only very few scanned points, or in some cases none at all, which satisfy the above selection criteria. For this reason, a certain minimum number of measured values is chosen which must be usable for evaluation purposes. If the original does not have sufficient scanned points satisfying the selection criteria, the three density values of the reference original are substituted for each scanned point missing from the chosen minimum number. This results in an under-correction since as the number of scanned points which can be evaluated decreases, the colour balance of the reference original increasingly forms the basis for colour correction. Since, on average, each original has a given proportion of intensely coloured image points, the minimum number of evaluated measured values is not adjusted for the total of all the scanned points, but only for a certain percentage thereof. For example, this percentage may be about 30-70, and advantageously about 50. Consequently if up to 70%-30% of the scanned points can be evaluated full colour correction is carried out whilst the values of the reference original are additionally taken into account only if there are less than 30%-70% scanned points which can be evaluated, with the final result of under-correction.

The measured values remaining after elimination of the scanned points which do not satisfy the selection criteria are converted in the process computer into area densities $\overline{D}_{i,j,k}$ for the individual primary colours $i$, $j$ and $k$ in accordance with the programme:

$$\overline{D}_{i,j,k} = \left( \sum_{r=1}^{R} e_r \right)^{-1} \sum_{r=1}^{R} e_r D_{r_{i,j,k}}$$

where R denotes the number of scanning points that can evaluated and/or the chosen minimum number. The weighting factors $e_r$ are generally all equal but if necessary they can be different. For example, a central zone of the film can be more taken into account than peripheral zones. Consequently, those important parts of the film which are generally situated at the centre of the image have a greater influence on the printing conditions than the less important parts of the image.

The area densities determined in this way are then advantageously used only for colour control, i.e., to control the mutual ratio of the three partial exposures in the individual primary colours. The following three differences are formed for this purpose:

$$\Delta i, j, k = \overline{D}_{i,j,k} - \frac{\overline{D}_i + \overline{D}_j + \overline{D}_k}{3}$$

and the exposure values for controlling colour balance are determined from them.

The total exposure time and hence the absolute density of the print are controlled on a different principle, for which purpose the mean values $D_{max_{i,j,k}}$ and $D_{min_{i,j,k}}$ are formed for the three primary colours from the density values of those scanned points having, for example, the five highest and five lowest densities of the primary colours concerned. Another mean value $\overline{\overline{D}}_{i,j,k}$ is then formed for each primary colour from these two mean values in accordance with the programme:

$$\overline{\overline{D}}_{i,j,k} = \frac{A \cdot D_{max_{i,j,k}} + B \cdot D_{min_{i,j,k}}}{A + B}$$

and a weighted mean value D is finally determined from the resulting three mean values $\overline{\overline{D}}_i$, $\overline{\overline{D}}_j$ and $\overline{\overline{D}}_k$ in accordance with the programme $$D = u \cdot \overline{\overline{D}}_i + v \cdot \overline{\overline{D}}_j + w \cdot \overline{\overline{D}}_k$$

The number of scanned points having the highest and lowest density values as evaluated for the density control should be at least two and preferable at least three to prevent random extreme values from having an excessive influence. The weighting factors A and B may be equal or be in the ratios of approximately 1:1 to 1:5. The weighting factors $u$, $v$ and $w$ are such that the primary colour blue has the minimum proportion, and the primary colour green the greatest proportion in the result. The following values have proved advantageous:

$$D = 0.1 \cdot \overline{\overline{D}}_B + 0.5 \overline{\overline{D}}_G + 0.4 \cdot \overline{\overline{D}}_R$$

This averaging programme takes into account the fact that yellow contributes the least and purple the most of the visual density of the print. If good quality printing material is used, however, just the mean value $\overline{\overline{D}}$ for the primary colour green can be used to determine the total exposure time:

$$D \sim \overline{\overline{D}}_G$$

Although only the evaluation of density values has been described, the transmission values of the individual scanned points can of course similarly be used to determine the exposure values, addition and subtraction being replaced by multiplication and division respectively and multiplication and division being replaced by involution and evolution in the above programming. Since, therefore, the evaluation of transmission values requires much greater calculation, the conversion of the transmission values to density values and the further processing of the latter are generally preferable.

Figure 2:
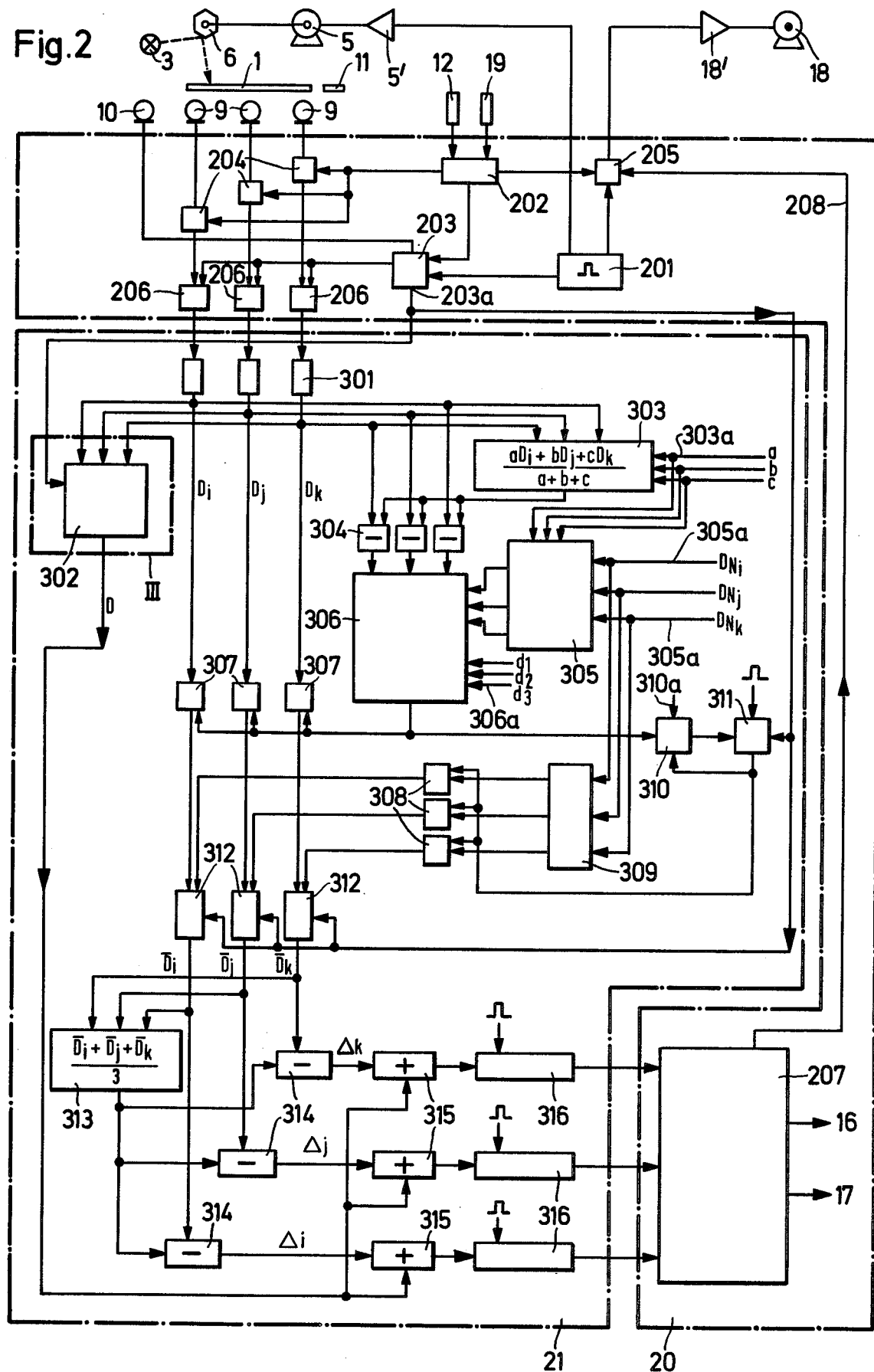
FIGS. 2 and 3 are electrical schematics of the control station and process computer components included in the exposure control apparatus.
Figure 3:
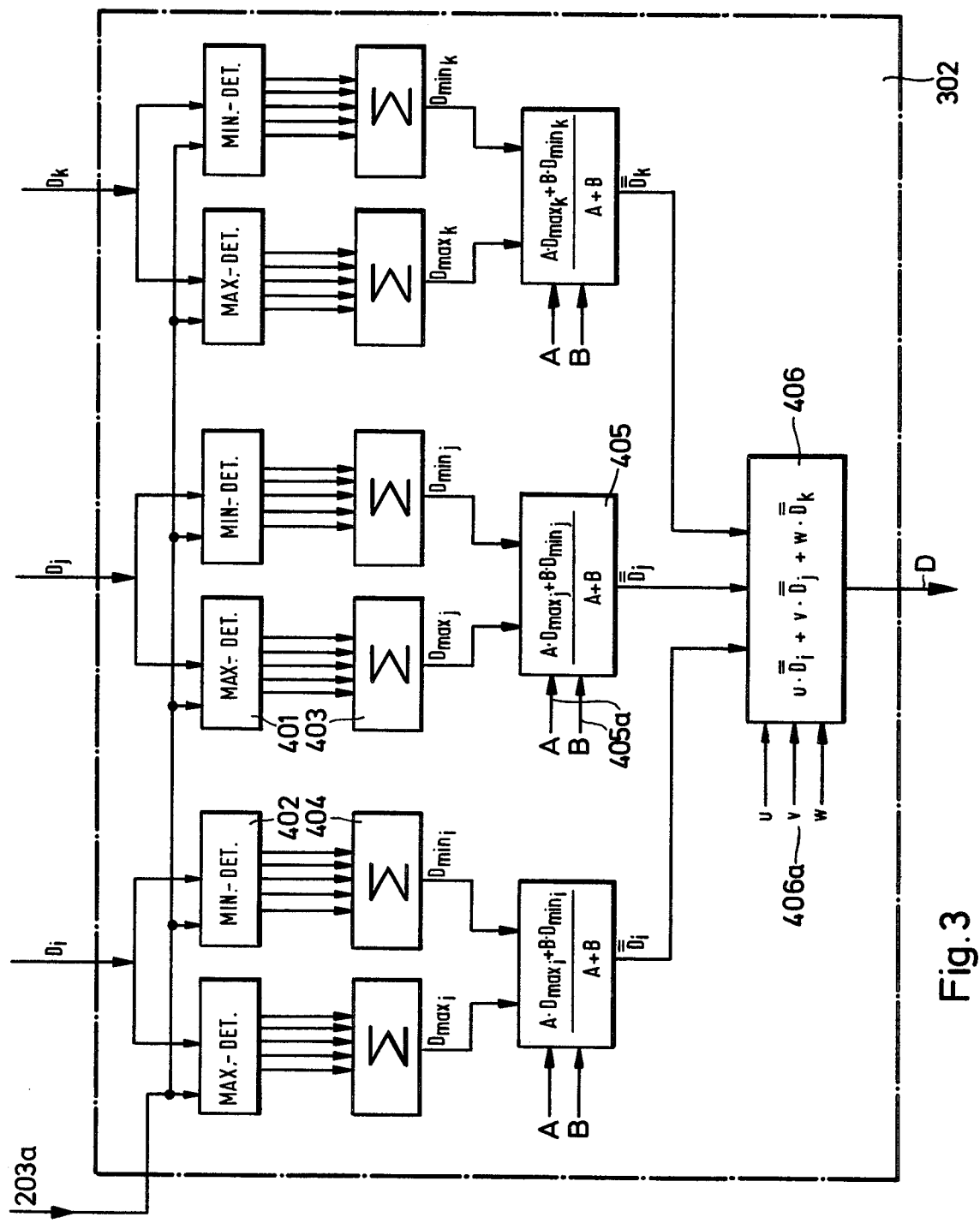

FIGS. 2 and 3 show the evaluating and control station 20, and the process computer 21 respectively in greater detail. The control station 20 comprises a central synch generator 201, a film movement detector 202, a synchronizing stage 203, gate circuits 204 and 205, blanking stages 206 and an exposure control stage 207. The latter is of the type used in printers having integral light measurement and disclosed, for example, in U.S. Pat. Nos. 3,482,916 and 3,672,768.

The process computer 21 comprises three logarithmic analogdigital converters 301, a density correction stage 302, a weighting unit 303, subtraction units 304, a comparative value forming unit 305, a discriminator 306, gate circuits 307 and 308, a store 309, a counter 310, another gate circuit 311, an averaging unit 312, another averaging unit 313, subtraction units 314, adding units 315 and shift registers 316.

For the sake of simplicity, the following description will refer only to density and other values, but of course these values are in the form of appropriate electrical signals in the control circuit.

The synchronous motor 5 for driving the mirror wheel 6 and the stepping motor 18 for the film transport are controlled by amplifiers 5' and 18' from the synch generator 205. The film movement detector 202 stops the film drive motor 18 via the gate circuit 205 when the notch sensor 19 indicates the correct position of a negative frame in the exposure station. As soon as exposure is over, the exposure control stage 207 delivers a signal to the gate circuit 205 via the line 208 so that the gate 205 opens and re-starts the film transport. The film movement detector 202 also controls the gate circuits 204 and the synchronizing stage 203. The former are opened and pass the scanned values detected by the photo-electric cells 9 to the blanking stages 206 only when the film is in motion (notch sensor 19) and when the notch sensor indicates the start of a frame area. The synchronizing stage 203 receives a line synch pulse from the photoelectric cell 10 and controls the blanking stages 206 so that they divide the scanning lines up into a number of discrete measured points and scan each individual frame of the film strip 1 in the same way so that each measured point for each frame occupies the same geometric position with respect to that frame. There is therefore a clear relationship between the order number of a measured point ($x^{th}$ point in the $y^{th}$ line) and the geometric location of this measured point on each measured frame on the film 1. The synchronizing stage 203 also delivers an end signal at its output 203a when a frame has been completely scanned. This end signal is fed to the averaging units 312 and the density correction stage 302 where, after each complete scanning, it re-sets the system to the initial stage so that these functional stages are prepared for processing the measured values from the next frame.

The analog discrete measured values generated by the blanking stages 206 are then fed to the process computer 21 where they pass to the logarithmic A/D converters 301 which convert them to digital colour density values $D_i$, $D_j$, $D_k$. These density values pass to the weighting unit 303, the subtraction units 304, the density correction stage 302 and, via the gate circuits 307, to the averaging units 312. The expression $(aD_i + bD_j + cD_k):(a+b+c)$ is formed in the weighting unit 303 from the three colour densities $D_i$, $D_j$, and $D_k$ for each discrete measured point. The weighting factors can be fed both to the weighting unit itself and to the comparative value forming unit 305 via an input denoted by the arrows 303a. The said expression is then subtracted from the colour densities $D_i$, $D_j$, and $D_k$ in the subtraction units 304 and the resulting differences are fed to the discriminator 306, to which the tolerances $d_1$, $d_2$, and $d_3$ can be fed via an input denoted by arrows 306a.

The three colour density values $D_{N_i}$, $D_{N_j}$, and $D_{N_k}$ of the standard or reference negative pass via the input denoted by arrows 305a to the store 309 and the comparison value forming unit 305. In a similar manner to the weighting unit 303 and subtraction units 304, unit 305 forms three different values therefrom, and they are also fed to the discriminator 306. In the latter, these difference values are compared with the difference values formed by the subtraction units 304. If the conditions described hereinbefore are satisfied, the discriminator passes a signal to the gate circuits 307 and to the counter 310, the former opening and passing the density values of the associated measured point to the averaging units 312 and advancing the counter 310 by one step. In this way all the colour densities of the measured points which are found to be assessable are fed to the averaging units.

The number of assessable measured points is counted by the counter. The counter 310 can be preset to a given setvalue as indicated by arrow 310a. When this setvalue is reached, it delivers a signal and automatically returns to its initial position. In practice, as already indicated above, the the counter is set to a value between about 30% and 70% of the total number of measured points. If the number of measured points found to be assessable is less than the preset value, the end signal from the synchronizing stage 203 can open the gate circuits 311 so that the latter pass synch pulses from the synch generator to the gate circuits 308 and to the counter 310. On each synch pulse, the three values $D_{N_i}$, $D_{N_j}$, $D_{N_k}$ are read out once from the store 309 and passed to the averaging units 312. At the same time, counter 310 counts on one step. As soon as the counter reaches its set-value position, it delivers a signal to the gate circuit 311 to close the latter so that no colour density trio can now be read out from the store.

The averaging units 312 each form an average from all the colour density values fed to them. These values are again averaged in the averaging unit 313. The last average value formed is then subtracted from the colour density mean values $\overline{D}_i$, $\overline{D}_j$, and $\overline{D}_k$ in the subtraction units 314. The resulting differences $\Delta i,j,k$ are added in the adding units 315 to the end value D; formed in the density correction stage 302 from the colour density $D_i$, $D_j$, and $D_k$ of all the measured points, such end value D governing the control of the total neutral density. The resulting three totals $(\Delta i,j,k+D)$ represent the equivalent input values (in the case of integral light measurement) for the exposure control stage 207 and are fed to the latter via shift registers 316. The shift registers deliver the input values to the exposure control stage 316 only when the film frame forming the basis of these values has arrived at the exposure station.

FIG. 3 shows the density correction stage 302 in detail. It comprises three maximum detectors 401, three minimum detectors 402, six averaging units 403 and 404, three weighting units 405 and a further weighting unit 406.

The maximum detectors 401 determine the five highest values from the colour densities $D_i$, $D_j$, $D_k$ of all the measuring points of each image field. In analogous manner, the minimum detectors 402 determine in each case the five lowest densities. From the five highest and lowest densities an average density $D_{max\,i,j,k}$ and an average minimum density $D_{min\,i,j,k}$ is formed in the averaging units 403 and 404 in each colour channel. These two average densities are averaged in the weighting units 405 with adjustable weighting factors A and B (arrows 405a). The three weighted average values $\overline{D}_i$, $\overline{D}_j$, and $\overline{D}_k$ thus obtained are finally weighted with the factors u,v,w and added in the weighting unit 406 and give the control density D which determines the total brightness. The weighting factors $u,v,w$ are adjustable, as is indicated by the arrows 406a.

What we claimed is:

1. A method of controlling the exposure in the production of photographic colour prints from an original comprising scanning the density of the original point-by-point with three primary colours, determining the density values of three primary colours in a reference original corresponding to the three primary colours used for scanning the original, selecting those scanned points which satisfy at least two of the following three conditions:

$$D_i - \frac{aD_i + bD_j + cD_k}{a+b+c} \leq D_{N_i} - \frac{aD_{N_i} + bD_{N_j} + cD_{N_k}}{a+b+c} \pm d_1$$

$$D_j - \frac{aD_i + bD_j + cD_k}{a+b+c} \leq D_{N_j} - \frac{aD_{N_i} + bD_{N_j} + cD_{N_k}}{a+b+c} \pm d_2$$

and $$D_k - \frac{aD_i + bD_j + cD_k}{a+b+c} \leq D_{N_k} - \frac{aD_{N_i} + bD_{N_j} + cD_{N_k}}{a+b+c} \pm d_3$$

where $D_i$, $D_j$ and $D_k$ denote the densities of the scanned points for the primary colours $i$, $j$ and $k$; $a$, $b$ and $c$ are constant factors; $d_1$, $d_2$ and $d_3$ are constant density values and $D_{N_i}$, $D_{N_j}$ and $D_{N_k}$ denote the densities for primary colours $i$, $j$, and $k$ of the reference original, and disregarding the scanned points which do not satisfy these conditions, determining the area densities of the three primary colours from the resulting selected density values, and evaluating the area densities in order to determine the exposure values for the three primary colours.

2. A method according to claim 1, including determining if the number of scanned points selected for determining the area densities is less than a predetermined percentage of all the scanned points, then utilising a number of reference original points making up the number of selected scanned points to said percentage in addition to the selected scanned points for determining the area densities.

3. A method according to claim 1 including averaging the densities of the points used for the area density determination to determine the area densities of the individual primary colours.

4. A method according to claim 3, wherein the averaging used is an unweighted averaging.

5. A method according to claim 1, wherein the difference between the area density of the primary colour concerned and the arithmetic mean of the surface densities in all three primary colours is formed for each primary colour and these three differences are evaluated to control the ratio between the proportions of the three primary colours in the print requiring to be made.

6. A method according to claim 1, forming a first mean value for each primary colour from at least the two highest densities occurring in the original, forming a second mean value from at least the two lowest densities in the original, forming a third mean value from these two mean values by weighted averaging, evaluating the three third mean values so formed and controlling the absolute density of the print requiring to be made by the evaluation of the three third mean values.

7. A method according to claim 6, including selecting the ratio of the two weighting factors required to form the third mean values in the range between 1:1 and 1:5.

8. A method according to claim 6 including forming a fourth mean value by weighted averaging from the three third mean values each associated with a primary colour, evaluating this fourth mean value and controlling the total exposure time by the evaluated fourth mean value.

9. A method according to claim 8 wherein the ratio of the weighting factor associated with the primary colour blue to the weighting factors associated with the primary colours green and red is selected to be about 1:5:4 in forming the fourth mean value.

10. A method according to claim 6 including evaluating only the third mean value associated with the primary colour green to control the total exposure time.

11. A method according to claim 1, selecting the three weighting factors $a$, $b$ and $c$ from the range of 0 to 1.

12. A method according to claim 1, including selecting the possible mutual ratios of any two of the three weighting factors $a$, $b$ and $c$ to be less than 10:1.

13. A method according to claim 1 including selecting all three weighting factors $a$, $b$ and $c$ to be equal.

14. A method according to claim 1 making the two weighting factors $a$ and $c$ equal to zero.

15. A method according to claim 1, including selecting only scanned points which satisfy all three selection conditions.

16. Apparatus for controlling the exposure in the production of photographic colour prints, comprising means for scanning the original point-by-point with three primary colours, means for determining the area densities in the three primary colours from the resulting density values, evaluating these area densities to determine the exposure values for the three primary colours, means for selecting those scanned points which satisfy at least two of the following three conditions:

$$D_i - \frac{aD_i + bD_j + cD_k}{a+b+c} \leq D_{N_i} - \frac{aD_{N_i} + bD_{N_j} + cD_{N_k}}{a+b+c} \pm d_1$$

$$D_j - \frac{aD_i + bD_j + cD_k}{a+b+c} \leq D_{N_j} - \frac{aD_{N_i} + bD_{N_j} + cD_{N_k}}{a+b+c} \pm d_2$$

and $$D_k - \frac{aD_i + bD_j + cD_k}{a+b+c} \leq D_{N_k} - \frac{aD_{N_i} + bD_{N_j} + cD_{N_k}}{a+b+c} \pm d_3$$

where $D_i$, $D_j$ and $D_k$ denote the densities of the scanned points for the primary colours $i$, $j$ and $k$; $a$, $b$ and $c$ being constant factors, $d_1$, $d_2$ and $d_3$ being constant density values, and $D_{N_i}$, $D_{N_j}$ and $D_{N_k}$ denoting the densities of the primary colours $i$, $j$, and $k$ of a reference original, means for disregarding the scanned points which do not satisfy these conditions in determining the area densities.

17. A photographic printer for producing photographic prints from an original, comprising
  a means for scanning the density of the original point-by-point in three primary colours $i$, $j$ and $k$ and evaluating density values $D_i$, $D_j$, $D_k$ of the three primary colours $i$, $j$, $k$ in each point of scan of the original,
  a process computer connected to said scanning means and programmed to
    select from all density values evaluated in the scanning means only those which originate from points of scan the three density values of which satisfy at least two of the following three conditions:

$$D_i - \frac{aD_i + bD_j + cD_k}{a+b+c} \leq D_{N_i} - \frac{aD_{N_i} + bD_{N_j} + cD_{Nk}}{a+b+c} \pm d_1$$

$$D_j - \frac{aD_i + bD_j + cD_k}{a+b+c} \leq D_{N_j} - \frac{aD_{N_i} + bD_{N_j} + cD_{N_k}}{a+b+c} \pm d_2$$

$$D_k - \frac{aD_i + bD_j + cD_k}{a+b+c} \leq D_{N_k} - \frac{aD_{N_i} + bD_{N_j} \pm cD_{N_k}}{a+b+c} \pm d_3$$

where $D_i$, $D_j$ and $D_k$ denote the densities of the scanned points for the primary colours $i$, $j$ and $k$;

$a$, $b$ and $c$ being constant factors, $d_1$, $d_2$ and $d_3$ being constant density values, and $D_{N_i}$, $D_{N_j}$ and $D_{N_k}$ denoting the densities of the primary colours $i$, $j$, and $k$ of a reference original, and to determine area density values in the three primary colours $i$, $j$, $k$ from the so selected density values; and a means for exposing a light sensitive material to light from said original, said exposure means having a control means which controls exposure in accordance with said area density values.

18. A photographic printer for producing photographic prints from an original, comprising a means for scanning the density of the original point-by-point in three primary colours $i$, $j$, $k$ and evaluating density values $D_i$, $D_j$, $D_k$ of the three primary colours $i$, $j$, $k$ in each point of scan of the original, a means responsive to said scanning means calculating for each individual point of scan three expressions:

$$D_i - \frac{aD_i + bD_j + cD_k}{a + b + c}$$

$$D_j - \frac{aD_i + bD_j + cD_k}{a + b + c}$$

$$D_k - \frac{aD_i + bD_j + cD_k}{a + b + c}$$

wherein $a$, $b$ and $c$ denote predetermined constant factors, a discriminator means comparing each of said three expressions for each point of scan to a corresponding one of three reference expressions:

$$D_{N_i} - \frac{aD_{N_i} + bD_{N_j} + cD_{N_k}}{a + b + c} \pm d_1$$

$$D_{N_j} - \frac{aD_{N_i} + bD_{N_j} + cD_{N_k}}{a + b + c} \pm d_2$$

$$D_{N_k} - \frac{aD_{N_i} + bD_{N_j} + cD_{N_k}}{a + b + c} \pm d_3$$

respectively, where $D_{N_i}$, $D_{N_j}$, $D_{N_k}$ denote predetermined density values for the primary colours $i$, $j$, $k$ of a reference originale and $d_1$, $d_2$, $d_3$ are predetermined constant values, a means responsive to said discriminator means selecting from all density values only those which originate from points of scan for which at least two of said three expressions are smaller than said corresponding reference expressions, a means evaluating from the selected density values area density values representative of the large area density in each of the three primary colours $i$, $j$, $k$ of the original, and a means for exposing a light sensitive material to light from said original, said exposure means having a control means which controls exposure in accordance with said area density values.

* * * * *